United States Patent
Reiff et al.

(10) Patent No.: US 10,048,691 B2
(45) Date of Patent: *Aug. 14, 2018

(54) DISTINGUISHING LANE MARKINGS FOR A VEHICLE TO FOLLOW

(71) Applicant: Ford Global Technologies, LLC, Dearborn, MI (US)

(72) Inventors: Brielle Reiff, Mountain View, CA (US); Jinesh J Jain, Palo Alto, CA (US); Sneha Kadetotad, Cupertino, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,093

(22) Filed: Oct. 3, 2017

(65) Prior Publication Data

US 2018/0024560 A1 Jan. 25, 2018

Related U.S. Application Data

(63) Continuation of application No. 14/943,573, filed on Nov. 17, 2015.

(51) Int. Cl.
*G01C 22/00* (2006.01)
*G05D 1/02* (2006.01)
(Continued)

(52) U.S. Cl.
CPC ............. *G05D 1/021* (2013.01); *B60W 30/12* (2013.01); *G06K 9/00798* (2013.01);
(Continued)

(58) Field of Classification Search
CPC .. G05D 1/21; B60W 30/12; B60W 2420/403; B60W 2710/20; G06K 9/00798; B60Y 2300/12
See application file for complete search history.

(56) References Cited

U.S. PATENT DOCUMENTS

6,311,123 B1 * 10/2001 Nakamura ......... B60K 31/0008
123/352
7,421,095 B2 9/2008 Ikeda
(Continued)

FOREIGN PATENT DOCUMENTS

WO WO-2013162847 A1 10/2013
WO WO-201474588 A1 5/2014

OTHER PUBLICATIONS

Unsupervised video-based lane detection using location-enhanced topic models.History: Revised Jul. 12, 2010; Accepted Aug. 5, 2010.

*Primary Examiner* — Hussein Elchanti
(74) *Attorney, Agent, or Firm* — David R. Stevens; Stevens Law Group (57) ABSTRACT

The present invention extends to methods, systems, and computer program products for distinguishing roadway surface lane markings for a vehicle to follow. Automated driving or driving assist vehicles utilize sensors to help the vehicle navigate on roadways or in parking areas. The sensors can utilize, for example, the painted surface markings to help guide the vehicle on its path. When ambiguity is detected between roadway surface markings, decision making algorithms identify a set of roadway surface markings for a vehicle to abide by. The sensors can also identify the location and trajectory of neighboring vehicles to increase confidence with respect to an identified set of roadway surface markings.

20 Claims, 4 Drawing Sheets

(51) Int. Cl.
*B60W 30/12* (2006.01)
*G06K 9/00* (2006.01)

(52) U.S. Cl.
CPC ... *B60W 2420/403* (2013.01); *B60W 2710/20* (2013.01); *B60Y 2300/12* (2013.01)

(56) References Cited

U.S. PATENT DOCUMENTS

| | | | |
|---|---|---|---|
| 8,107,683 B2 | 1/2012 | Aoki | |
| 8,224,031 B2 | 7/2012 | Saito | |
| 2012/0010797 A1* | 1/2012 | Luo | F02N 11/0837 |
| | | | 701/70 |
| 2013/0079990 A1* | 3/2013 | Fritsch | B62D 6/007 |
| | | | 701/41 |
| 2013/0242102 A1* | 9/2013 | Tsuchiya | G08G 1/166 |
| | | | 348/148 |
| 2014/0003709 A1 | 1/2014 | Ranganathan | |
| 2014/0136414 A1* | 5/2014 | Abhyanker | G06Q 50/28 |
| | | | 705/44 |
| 2014/0172221 A1* | 6/2014 | Solyom | B62D 15/0285 |
| | | | 701/23 |
| 2014/0267415 A1* | 9/2014 | Tang | G06T 11/60 |
| | | | 345/633 |
| 2014/0358420 A1* | 12/2014 | Noh | G01C 21/28 |
| | | | 701/409 |
| 2016/0012300 A1* | 1/2016 | Tsuruta | G06K 9/00798 |
| | | | 382/104 |
| 2016/0176358 A1* | 6/2016 | Raghu | G06K 9/00798 |
| | | | 382/104 |
| 2016/0327948 A1* | 11/2016 | Taguchi | G01C 25/00 |

* cited by examiner

DISTINGUISHING LANE MARKINGS FOR A VEHICLE TO FOLLOW

CROSS-REFERENCE TO RELATED APPLICATIONS

This application is a continuation of and claims the benefit of and priority to U.S. patent application Ser. No. 14/943,573, entitled "Distinguishing Lane Markings For A Vehicle To Follow", filed Nov. 17, 2015, the entire contents of which are expressly incorporated by reference.

BACKGROUND

1. Field of the Invention

This invention relates generally to the field of road line detection systems, and, more particularly, to road line detection systems which can distinguish lane markings for a vehicle to follow.

2. Related Art

Many industries, including the automotive industry, are utilizing advanced automation capabilities. The opportunity exists to automate many of the functions of a traditional vehicle. Some research is being performed in the automotive industry to make a vehicle completely autonomous; requiring no human input at all.

Several benefits exist as the result of vehicles becoming more automated or completely autonomous. Benefits include reduced traffic accidents, improved traffic flow, and reduced fuel consumption, just to name a few. For example, many vehicles are utilizing collision avoidance technology where the vehicle's computer system can apply the brakes if the vehicle's sensors detect that the vehicle is in danger of colliding with another vehicle or object. Also, many vehicles have introduced a parallel parking feature which allows the vehicle to parallel park without any input from the driver of the vehicle.

The plausibility of automated or autonomous vehicles is heavily dependent on the ability of the vehicle sensors and the vehicle computer system to identify and process the vehicle's environment and to react to different situations in a safe and efficient manner. However, the vehicle environment is very dynamic. Thus, the vehicle computer system needs to be able to perform in varying weather conditions, such as, rain or snow, and react to various road conditions, such as, icy roads or roads that are under construction. The challenge exists to guarantee a safe and efficient driving experience, regardless of the vehicle environment.

Some vehicle automation techniques used for vehicle navigation consider the painted lane markings on the surface of a road. The lane markings can be used as a means to safely guide the vehicle along its route. However, at least a few difficulties arise from the use of lane markings. For example, road surface markings not only include lane markings, but they also include navigation information, such as, turning lane indicators, speed limit information, crosswalk information, railroad information, and high-occupancy vehicle (HOV) markings. Distinguishing between lane markings and other road surface markings can be difficult.

Another challenge is distinguishing between ambiguous lane markers that can occur, for example, during road construction, maintenance, or upgrades. Lanes can be shifted to one side or another during periods of construction to facilitate the maintenance of roads. During the period of construction road maintenance, or upgrades, new lane markings are painted onto the road and old lane markings can either be scraped away or painted in the color of the road in an effort to mask the old lane markings. However, masking attempts are not always fully successful and old lane markings can sometimes be seen after scraping or re-painting. As such, conditions may exist where two sets of lane markings can be seen for a particular lane of the road. Determining which set of lane markings to follow in an automated manner can be difficult.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for distinguishing lane markings for a vehicle to follow.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, aspects of the invention are directed to distinguishing lane markings for a vehicle to follow. At least two different types of sensory devices gather data related to the vehicles environment. The data is processed to identify road surface markings and neighboring vehicles. Important regions of interest are extracted from the processed data. Lane marking data and neighboring vehicle data is utilized to identify the correct set of lane markings for a vehicle to follow. The correct lane markings are utilized by the vehicle computer system and control system to navigate the vehicle on the correct lane of the road.

Figure 1:
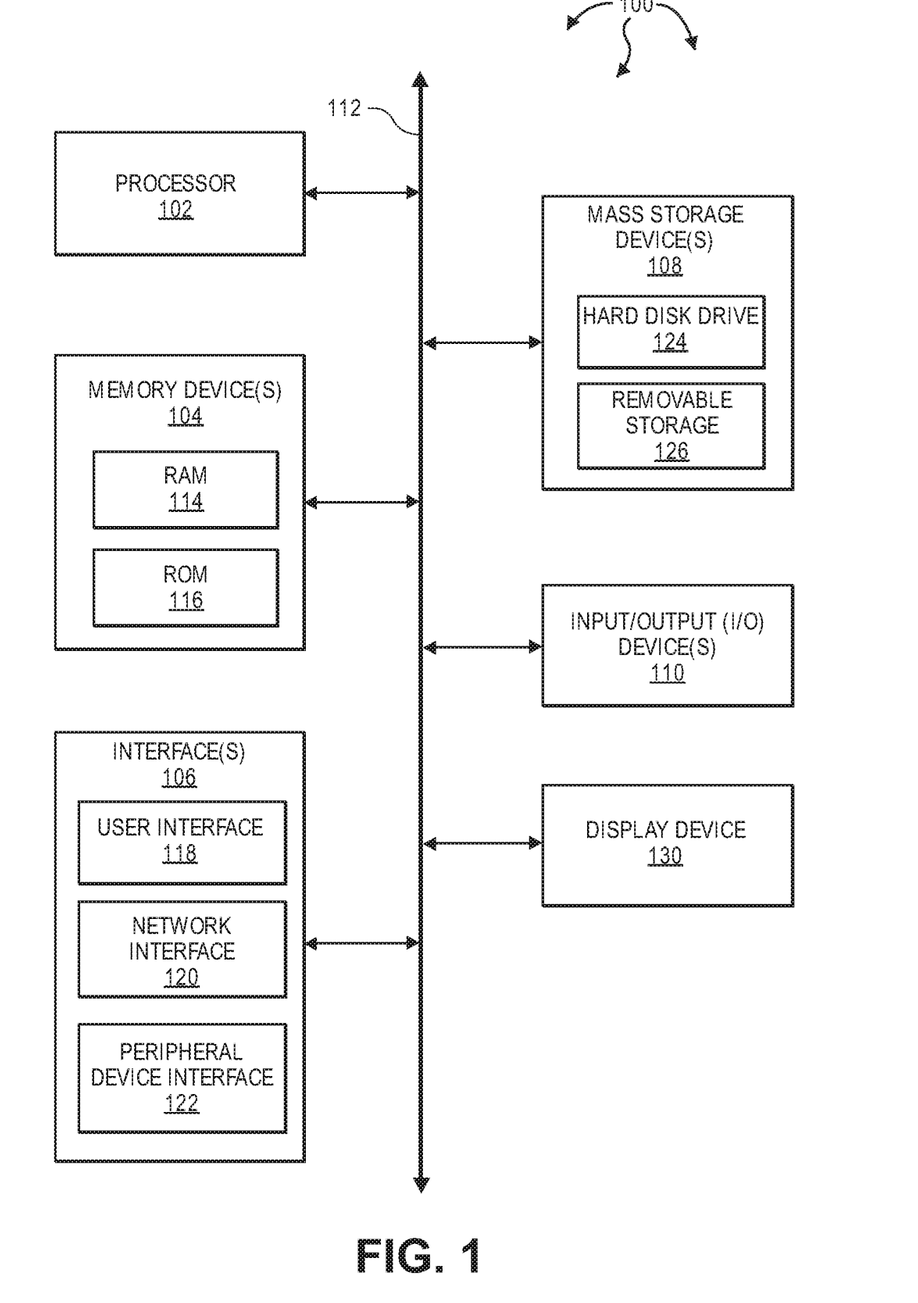
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Aspects of the invention can be used to identify and compare road surface markings in order to correctly abide by relevant (e.g., newer) road instructions. Camera, lidar (light detection and ranging), and other range sensors can be used to capture information of the road and surrounding vehicles. Computer vision and sensor fusion algorithms employing neural networks can be trained to recognize surrounding vehicles and conflicting road surface marking regions of interest on roadways and parking lots. When multiple sets of markings are detected, factors including intensity of color, reflectivity, presence of lane reflectors, paint cracking, and road tape peeling can be used to compare surface marking sets and determine relevant (e.g., newer) markings to follow. Other roadway marking information can also be used. The behavior of other vehicles can also be used to add certainty when determining a set of markings to follow.

Identifying and comparing road surface markings can include: (1) Using neural networks to identify surface markings on the road and other vehicles within sensor viewing ranges, (2) Determining bounding boxes for identified regions of interest, (3) Sending image data within bounding boxes to algorithms configured to determine if there are multiple sets of road surface markings, and if so, compare the sets to determine the relevant set of markings to follow, and (4) Sending the relevant road surface markings to the vehicle decision making algorithms.

Figure 2:
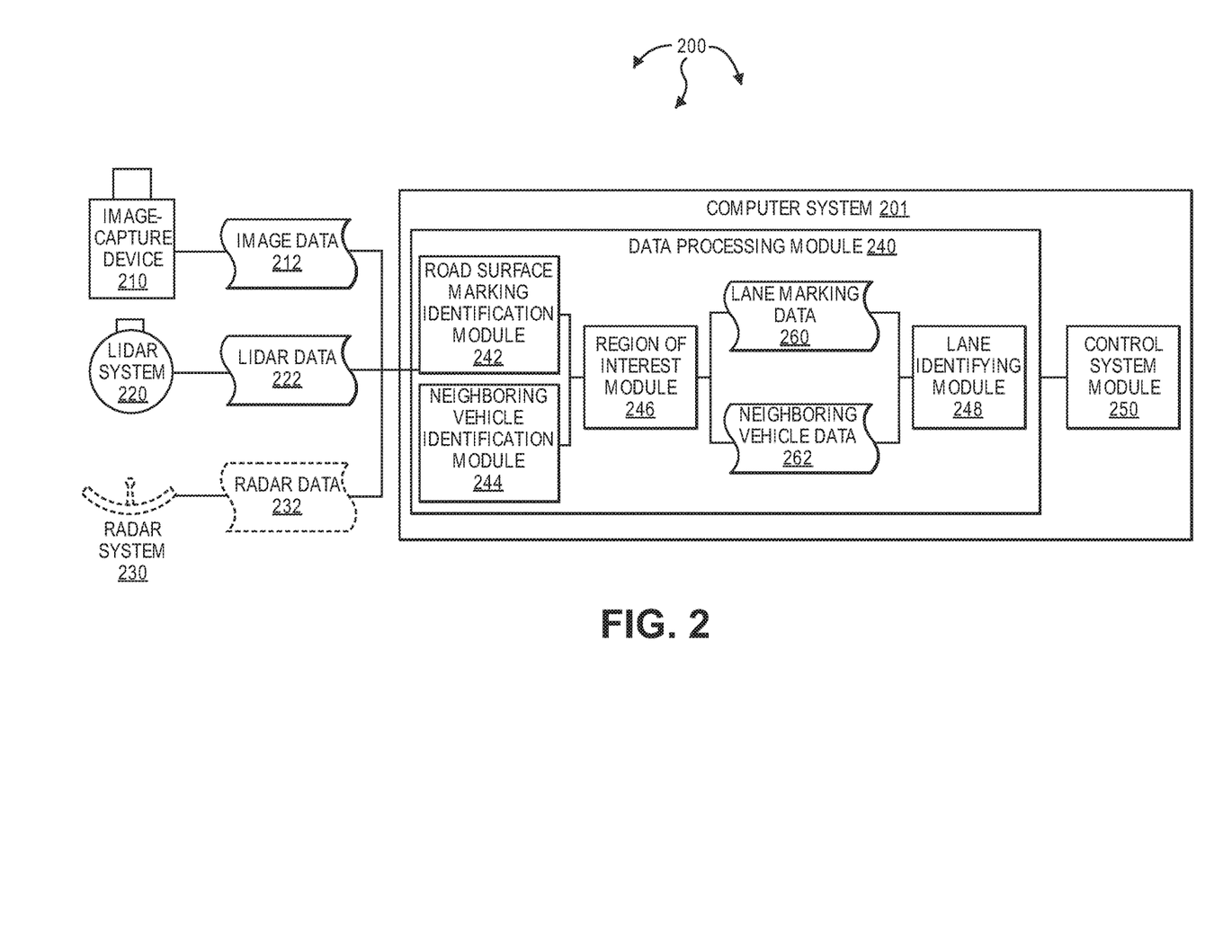
FIG. 2 illustrates an example computer architecture that facilitates distinguishing lane markings for a vehicle to follow.

FIG. 2 illustrates an example computer architecture 200 that facilitates distinguishing lane markings for a vehicle to follow. Computer architecture 200 can be contained within a vehicle, such as, for example, a car, a truck, a bus, or a motorcycle. Referring to FIG. 2, computer architecture 200 includes computer system 201, image-capture device 210, and lidar system 220. In some embodiments, radar system 230 is also included. Each of computer system 201, image-capture device 210, lidar system 220, and radar system 230, as well as their respective components can be connected to one another over (or be part of) a network, such as, for example, a PAN, a LAN, a WAN, and even the Internet. Accordingly, each of computer system 201, image-capture device 210, lidar system 220, and radar system 230 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

In one aspect, each of image-capture device 210, lidar system 220, and possibly radar system 230 are included in a vehicle. Each of the sensing devices is configured to sense data in the vicinity of the vehicle. For example, image-capture device 210 is configured to capture image data 212, lidar system 220 is configured to capture lidar data 222, and radar system 230 is configured to capture radar data 232.

As depicted, computer system 201 includes data processing module 240 and control system module 250. Data processing module 240 is configured to receive data from the sensing devices. For example, data processing module 240 can receive image data 212 from image-capture device 210, lidar data 222 from lidar system 220, and in some aspects, radar data 232 from radar system 230.

Data processing module 240 further includes road surface marking identification module 242, neighboring vehicle identification module 244, region of interest module 246, and lane identifying module 248.

Road surface marking identification module 242 is configured to identify road markings in the vicinity of a vehicle from information contained in received sensor data. Information can include attributes, such as, for example, color intensity, reflectivity, presence of lane reflectors, paint cracking, and road tape peeling. Other roadway marking information can also be used.

Neighboring vehicle identification module 244 is configured to detect neighboring vehicles from information contained in received sensor data. For example, neighboring vehicle information module 244 can detect the location and trajectory of neighboring vehicles. Detected vehicles may be going in the same direction as a vehicle that includes image-capture device 210, lidar system 220, and possibly radar system 230 (e.g., in the same lane as the vehicle or in a lane adjacent to the vehicle). Detected vehicles may also be travelling toward the automated vehicle (e.g., in oncoming traffic).

Region of interest module 246 is configured to identify lane marking data for determining the correct lane markings to follow. For example, region of interest module 246 can identify lane marking data 260 relative to a vehicle and exclude other road surface markings such as speed limit information, HOV markings, and the like. Region of interest module 246 can also identify neighboring vehicle data 262 related to the location and trajectory of neighboring vehicles in relevant proximity to a vehicle.

Region of interest module 246 is configured to pass lane marking data 260 and neighboring vehicle data 262 to lane identifying module 248. Lane identifying module 248 is configured to utilize the attributes of the lane marking data 260 to determine the relevant set of lane markings to follow. For example, the attributes of the lane markings may include intensity of color, reflectivity, presence of lane reflectors, paint cracking, and road tape peeling. Attributes of other roadway markings can also be used. Lane identifying module 248 can utilize neighboring vehicle data 262 to determine the location and trajectory of neighboring vehicles. Once lane identifying module 248 has identified relevant lane markings to follow, lane identifying module can use the location and trajectory of neighboring vehicles to increase the confidence level that the relevant lane markings are in fact the lane markings to follow.

Control system module 250 is configured to utilize the relevant lane markings to control the vehicle's location and trajectory.

Figure 3:
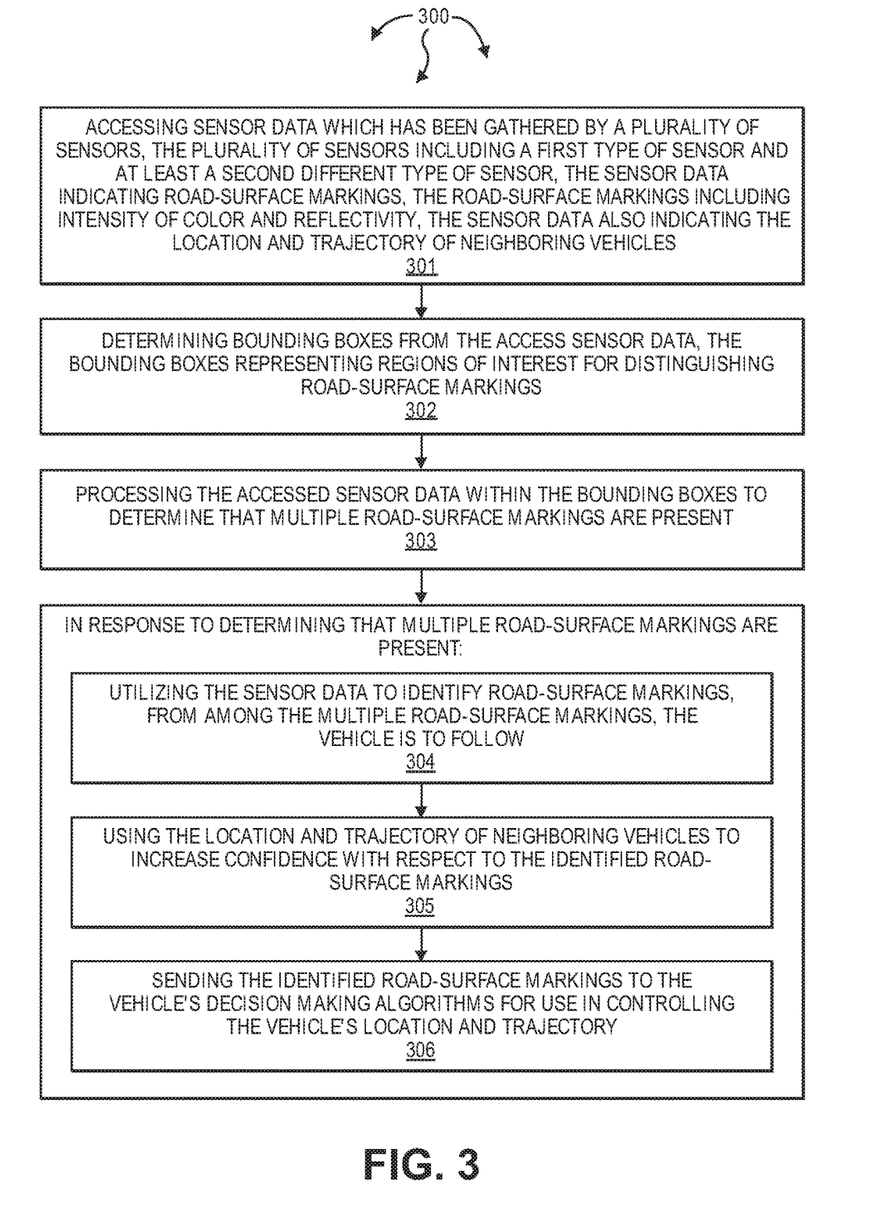
FIG. 3 illustrates a flow chart of an example method for distinguishing lane markings for a vehicle to follow.

FIG. 3 illustrates a flow chart of an example method 300 for distinguishing lane markings for a vehicle to follow. Method 300 will be described with respect to the components and data of computer architecture 200.

Method 300 includes accessing sensor data which has been gathered by a plurality of sensors, the plurality of sensors including a first type of sensor and at least a second different type of sensor, the sensor data indicating road-surface markings, the road-surface markings including intensity of color and reflectivity, the sensor data also indicating the location and trajectory of neighboring vehicles (301). For example, a vehicle can include a computer system 201, image-capture device 210, lidar system 220, and possibly also radar system 230. Other sensors are possible, as well. Image-capture device 210 can capture image data 212, lidar system 220 can capture lidar data 222, and, when included, radar system 230 can capture radar data 232. Data processing module 240 can access image data 212, lidar data 222, and, when appropriate, radar data 232. Collectively, image data 212, lidar data 222, and, when appropriate, radar data 232 (hereinafter also referred to as the "accessed sensor data") can indicate road surface markings and neighboring vehicles in the vicinity of the vehicle. The indication of road surface markings can include data for determining color intensity and reflectivity for the road surface markings. The indication of neighboring vehicles can include data for determining location and trajectory.

Road surface marking module 242 can utilize the accessed sensor data to identify road surface markings on the road. For example, road surface marking module 242 can identify painted lane markings, turn lane markings, stop sign markings, speed limit markings, and railroad crossing markings, just to name a few.

Neighboring vehicle identification module 244 can utilize the accessed sensor data to identify neighboring vehicles. For example, neighboring vehicle identification module 244 can identify the location and trajectory of neighboring vehicles on the road with the vehicle.

Method 300 includes determining bounding boxes from the accessed sensor data, the bounding boxes representing regions of interest for distinguishing road-surface markings and neighboring vehicles (302). For example, region of interest module 246 can determine bounding boxes from image data 212, lidar data 222, and, when appropriate, radar data 232. In one aspect, image data 212 depicts an image of the road and the associated lane markings and vehicles on the road at the time of the image capture. Region of interest module 246 can isolate the lane marking data and neighboring vehicle data necessary for identifying the lane for the vehicle to follow.

For example, road markings in image data 212 can include two solid yellow lines, two faded yellow lines, a solid dashed white line, a faded dashed white line, a solid white line, and a faded white line. The faded lines are not as bright or as prominent as the other lines described herein. Region of interest module 246 can utilize bounding box algorithms to determine the bounding box of the solid yellow lines, the bounding box of the faded yellow lines, the bounding box of the solid dashed white line, the bounding box of the faded dashed white line, the bounding box of the solid white line, and the bounding box of the faded white line.

Region of interest module 246 can also isolate neighboring vehicle data from the accessed sensor data utilizing bounding boxes. The accessed sensor data can indicate other vehicles on the road. For example, the accessed sensor data may depict a vehicle in the same lane, a vehicle in the adjacent lane, an oncoming vehicle in the adjacent lane, and an oncoming vehicle in the far lane. Region of interest module 246 can utilize bounding box algorithms to determine any of: a bounding box of a vehicle in the same lane, a bounding box of a vehicle in the adjacent lane, a bounding box of the oncoming vehicle in an adjacent lane, and a bounding box of a vehicle in an oncoming far lane.

Method 300 includes processing the accessed sensor data within the bounding boxes to determine that multiple road-surface markings are present (303). For example, data processing module 240 can process the accessed sensor data contained within the bounding boxes to determine that multiple lane markings exist in the lane of the road that the vehicle is traveling. The multiple lane markings can include two solid yellow lines and two faded yellow lines. Data processing module 240 can recognize the two sets of road-surface markings as ambiguous and/or conflicting and determine that multiple road-surface markings are present. Data processing module 240 can represent the two sets of road-surface markings in lane marking data 260.

Data processing module 240 can also represent neighboring vehicles identified in neighboring vehicle data 262. For example, neighboring vehicle data 262 can identify the location and trajectory of neighboring vehicles.

In response to determining that multiple road-surface markings are present, method 300 includes utilizing the sensor data to identify road-surface markings, from among the multiple road-surface markings, the vehicle is to follow (304). For example, lane identifying module 248 can utilize lane marking data 260 to identify the road-surface markings, from among the multiple road-surface markings, the vehicle is to follow. Lane identifying module 248 can utilize the accessed sensor data to compare the intensity of color, reflectivity, presence of lane reflectors, paint cracking, and road tape peeling of both the two solid yellow lines and the two faded solid yellow lines and the solid dashed white line and the faded dashed white line. Other attributes can be compared, as well. Given the accessed sensor data, the lane identifying module 248 can identify the two solid yellow lines and the solid dashed white line as the relevant lane markings for the lane for which the vehicle is to follow.

In response to determining that multiple road-surface markings are present, method 300 includes using the location and trajectory of neighboring vehicles to increase confidence with respect to the identified road-surface markings (305). For example, lane identifying module 248 can utilize neighboring vehicle data 262 to identify the location and trajectory of neighboring vehicles to increase confidence with respect to identification of the two solid yellow lines and the solid dashed white line as the relevant lane markings. Lane identifying module 248 can determine that a vehicle is moving in the same direction and in the same lane as the vehicle. Lane identifying module 248 can determine that a neighboring vehicle is moving in the same direction as the vehicle in an adjacent lane. Furthermore, lane identifying module 248 can identify other neighboring vehicles as vehicles going in the opposite direction and in the adjacent lanes of the vehicle. Given the location and trajectory information of the neighboring vehicles, the lane identifying module 248 has increased confidence that two solid yellow lines and the solid dashed white line are relevant.

In response to determining that multiple road-surface markings are present, method 300 includes sending the identified road-surface markings to the vehicle's decision making algorithms for use in controlling the vehicle's location and trajectory (306). For example, data processing module 240 can send the two solid yellow lines and the solid dashed white line to control system module 250 for use in controlling the vehicle's location and trajectory.

Figure 4:
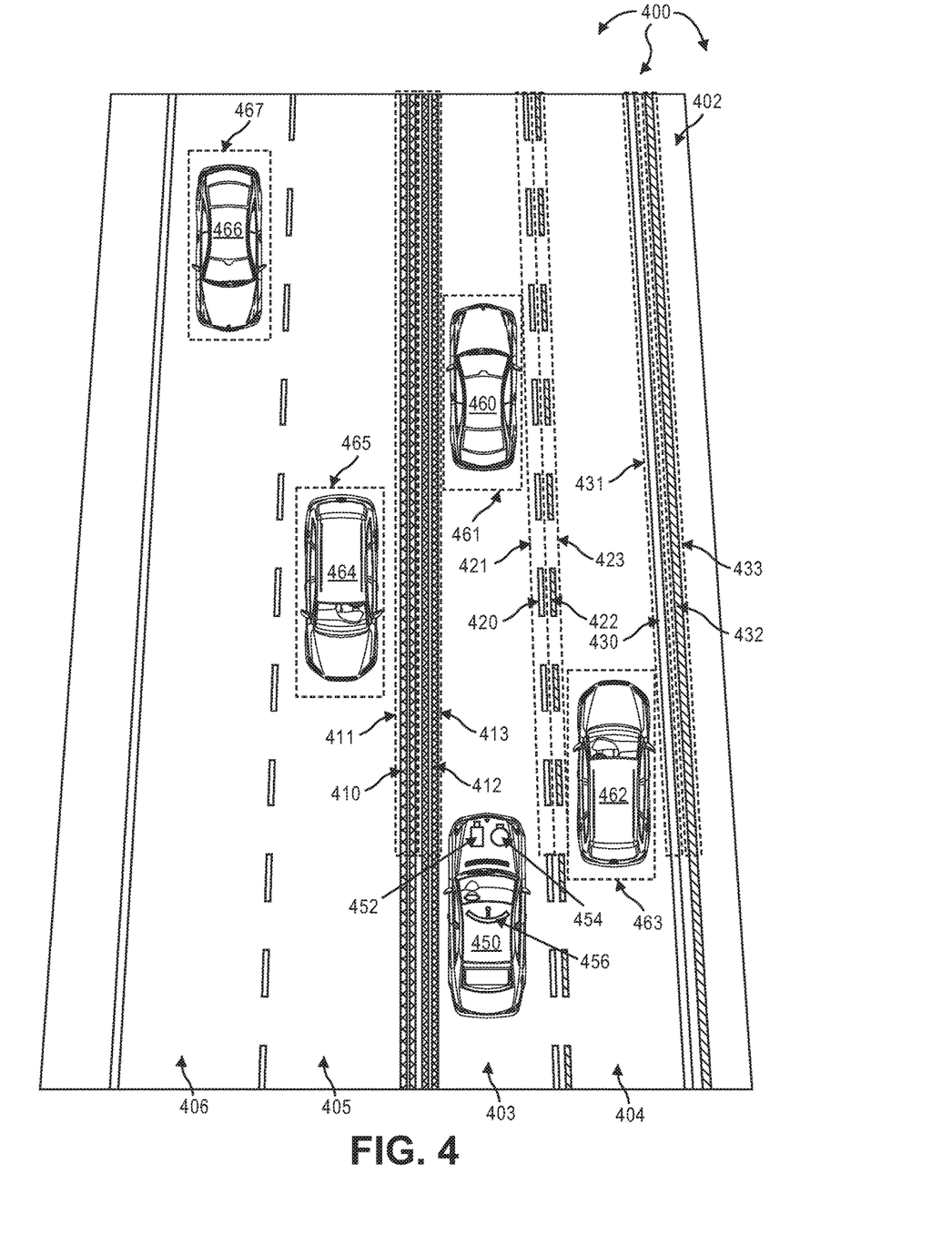
FIG. 4 illustrates an example roadway scenario.

FIG. 4 illustrates an example roadway scenario 400. As depicted, road 402 includes lanes 403, 404, 405, and 406. Vehicle 450 is traveling in lane 403 on road 402. Vehicle 450 includes a computer system (not shown) that is configured to control the vehicle 450 in an autonomous mode. In one aspect, the computer system is similar to computer system 201. To this end, the computer system may use lane information, such as lane markings, to estimate the bounds of lane 403.

Vehicle 450 includes image-capture device 452, lidar unit 454, and/or radar unit 456. Other sensors are possible, as well. Vehicle 450 can use the plurality of sensors to obtain information about lane 403. For example, the computer system can use image-capture device 452 and lidar unit 454 to sense lane markings of lane 403. In some aspects, radar unit 456 may also be used to gather information about the environment of vehicle 450.

The computer system can be configured to identify regions of interest from the accessed sensor data utilizing bounding boxes. For example, the accessed data from image-capture device 452 may depict an image of the road 402. The image can include associated lane markings and vehicles on the road 402 at the time of the image capture. The computer system can isolate the lane marking data and neighboring vehicle data necessary for identifying the bounds of lane 403 for vehicle 450 to follow.

The computer system can isolate road marking data from the accessed sensor data utilizing bounding boxes. For example, the road markings in the accessed sensor data may include two solid yellow lines 410, two faded yellow lines 412, a solid dashed white line 420, a faded dashed white line 422, a solid white line 430, and a faded white line 432. The computer system can utilize bounding box algorithms to determine: a bounding box 411 of the solid yellow lines 410, a bounding box 413 of the faded yellow lines 412, a bounding box 421 of the solid dashed white line 420, a bounding box 423 of the faded dashed white line 422, a bounding box 431 of the solid white line 430, and a bounding box 433 of the faded white line 432.

The computer system can also isolate neighboring vehicle data from the accessed sensor data utilizing bounding boxes. The accessed sensor data may depict other vehicles on the road. For example, the accessed sensor data can indicate vehicle 460 in lane 403, vehicle 462 in lane 404, an oncoming vehicle 464 in lane 405, and an oncoming vehicle 466 in lane 406. The computer system can utilize bounding box algorithms to determine: a bounding box 461 for vehicle 460, a bounding box 463 for vehicle 462, a bounding box 465 for oncoming vehicle 464, and a bounding box 467 for vehicle 466.

The computer system can process the accessed sensor data contained within the bounding boxes to determine that multiple lane markings exist in the lane 403. For example, the road markings in the accessed sensor data within the bounding boxes may depict both two solid yellow lines 410 and two faded yellow lines 412. The computer system can recognize the two sets of road-surface markings as ambiguous and/or conflicting sets of lane markings. As such, the computer system determines that multiple road-surface markings are present.

In response to determining that multiple road-surface markings are present, the computer system can utilize the accessed sensor data to identify relevant road-surface markings that vehicle 450 is to follow. For example, the computer system can utilize the accessed sensor data to compare the intensity of color, reflectivity, presence of lane reflectors, paint cracking, and road tape peeling of the two solid yellow lines 410 and the two faded yellow lines 412. Similarly, the computer system can utilize the accessed sensor data to compare the intensity of color, reflectivity, presence of lane reflectors, paint cracking, and road tape peeling of the solid white dashed line 420 and the faded dashed white line 422. Other factors may also be used. Based on the accessed sensor data, the computer system can identify the two solid yellow lines 410 and the solid dashed white line 420 as the relevant (and correct) lane markings bounding lane 403.

Additionally, the computer system is able to use the location and trajectory of neighboring vehicles to increase confidence with respect to identification of the two solid yellow lines 410 and the solid dashed white line 420. For example, the accessed sensor data can indicate the location and trajectory of vehicle 460. The computer system can determine that vehicle 460 is moving in lane 403 in the same direction as vehicle 450. The accessed sensor data can indicate the location and trajectory of vehicle 462. The computer system 401 can determine that vehicle 462 is moving in lane 404 in the same direction as vehicle 450. Furthermore, the computer system 401 can identify vehicle 464 and vehicle 466 going in the opposite direction of vehicle 450 in lanes 405 and 406 respectively. Given the location and trajectory information of the neighboring vehicles, the computer system has increased confidence that the two solid yellow lines 410 and the solid dashed white line 420 were appropriately identified.

After the correct lane markings have been identified, the computer system can pass the identified correct lane markings to vehicle 450's decision making algorithms for use in controlling the vehicle's location and trajectory.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method for automatically controlling a vehicle, the method comprising a processor:

accessing sensor data from a plurality of sensors at the vehicle, the plurality of sensors monitoring a roadway where the vehicle is located;

determining bounding boxes from the accessed sensor data, the bounding boxes representing regions of interest in the roadway for distinguishing roadway surface lane markings;
processing the accessed sensor data within the bounding boxes to identify a set of roadway surface lane markings the vehicle is to follow; and
controlling the vehicle within a lane of the roadway by following the set of roadway surface lane markings.

2. The method of claim 1, wherein accessing sensor data comprises accessing sensor data indicating one or more of: speed limit information painted onto a surface of the roadway or stop sign information painted onto a surface of the roadway.

3. The method of claim 1, wherein determining bounding boxes from the accessed sensor data comprises determining bounding boxes for distinguishing neighboring vehicles.

4. The method of claim 3, further comprising:
processing the accessed sensor data to identify location and trajectory of the neighboring vehicles; and
using the location and trajectory of the neighboring vehicles to increase confidence with respect to identification of the identified set of roadway surface lane markings.

5. The method of claim 4, wherein identifying the location and trajectories associated with neighboring vehicles on or near the road comprises identifying vehicles in the same lane as the vehicle.

6. The method of claim 4, wherein identifying the location and trajectories associated with neighboring vehicles on or near the road comprises identifying vehicles in a different lane than the vehicle.

7. The method of claim 4, wherein identifying the location and trajectories associated with neighboring vehicles comprises at least one of: identifying vehicles traveling in a same direction relative to a direction of the vehicle or identifying vehicles traveling in an opposite direction relative to the direction of the vehicle.

8. The method of claim 1, wherein identifying a set of roadway surface lane markings comprises detecting at least two candidate lane markings of a different visual appearance.

9. The method of claim 8, wherein detecting at least two lane markings of a different visual appearance comprises detecting at least two lane markings that differ in one or more of: intensity of color, reflectivity, presence of lane reflectors, paint cracking, or road tape peeling.

10. The method of claim 1, wherein accessing sensor data from a plurality of sensors comprises accessing data from one or more of: an image capture device, a lidar system, and a radar system.

11. A system, the system comprising:
one or more processors;
system memory coupled to one or more processors, the system memory storing instructions that are executable by the one or more processors; and
the one or more processors executing the instructions stored in the system memory to automatically control a vehicle, including the following:
access sensor data from a plurality of sensors at the vehicle, the plurality of sensors monitoring a roadway where the vehicle is located;
determine bounding boxes from the accessed sensor data, the bounding boxes representing regions of interest in the roadway for distinguishing roadway surface lane markings;
process the accessed sensor data within the bounding boxes to identify a set of roadway surface lane markings the vehicle is to follow; and
control the vehicle within a lane of the roadway by following the set of roadway surface lane markings.

12. The system of claim 11, wherein the one or more processors executing the instructions stored in the system memory to determine bounding boxes from the accessed sensor data comprises the one or more processors executing the instructions stored in the system memory to determine bounding boxes for distinguishing neighboring vehicles; and
further comprising the one or more processors executing the instructions stored in the system memory to:
process the accessed sensor data to identify location and trajectory of the neighboring vehicles; and
use the location and trajectory of the neighboring vehicles to increase confidence with respect to identification of the identified set of roadway surface lane markings.

13. The system of claim 11, wherein the one or more processors executing the instructions stored in the system memory to identify a set of roadway surface lane markings comprises the one or more processors executing the instructions stored in the system memory to detect at least two lane markings of a different visual appearance.

14. The system of claim 13, wherein the one or more processors executing the instructions stored in the system memory to detect at least two candidate lane markings of a different visual appearance comprises detecting at least two candidate lane markings that differ in on or more of: intensity of color, reflectivity, presence of lane reflectors, paint cracking, or road tape peeling.

15. The system of claim 11, wherein the one or more processors executing the instructions stored in the system memory to access sensor data from a plurality of sensors comprises the one or more processors executing the instructions stored in the system memory to access data from one or more of: an image capture device, a lidar system, and a radar system.

16. A vehicle, the vehicle comprising:
one or more processors;
system memory coupled to one or more processors, the system memory storing instructions that are executable by the one or more processors;
a plurality of sensors monitoring a roadway where the vehicle is located; and
the one or more processors executing the instructions stored in the system memory to automatically control the vehicle, including the following:
access sensor data from the plurality of sensors;
determine bounding boxes from the accessed sensor data, the bounding boxes representing regions of interest in the roadway for distinguishing roadway surface lane markings;
process the accessed sensor data within the bounding boxes to identify a set of roadway surface lane markings the vehicle is to follow; and
control the vehicle within a lane of the roadway by following the set of roadway surface lane markings.

17. The vehicle of claim 16, wherein the one or more processors executing the instructions stored in the system memory to determine bounding boxes from the accessed sensor data comprises the one or more processors executing the instructions stored in the system memory to determine bounding boxes for distinguishing neighboring vehicles; and
further comprising the one or more processors executing the instructions stored in the system memory to:

process the accessed sensor data to identify location and trajectory of the neighboring vehicles; and use the location and trajectory of the neighboring vehicles to increase confidence with respect to identification of the identified set of roadway surface lane markings.

18. The vehicle of claim 16, wherein the one or more processors executing the instructions stored in the system memory to identify a set of roadway surface lane markings comprises the one or more processors executing the instructions stored in the system memory to detect at least two lane markings of a different visual appearance.

19. The vehicle of claim 18, wherein the one or more processors executing the instructions stored in the system memory to detect at least two candidate lane markings of a different visual appearance comprises detecting at least two candidate lane markings that differ in on or more of: intensity of color, reflectivity, presence of lane reflectors, paint cracking, or road tape peeling.

20. The vehicle of claim 16, wherein the one or more processors executing the instructions stored in the system memory to access sensor data from a plurality of sensors comprises the one or more processors executing the instructions stored in the system memory to access data from one or more of: an image capture device, a lidar system, and a radar system.

* * * * *